Patented Aug. 12, 1930

1,772,618

UNITED STATES PATENT OFFICE

HENRY GUSTAV SCHMIDT, OF AMERICAN FORK CITY, UTAH

ANTIFREEZING LIQUID

No Drawing.  Application filed August 22, 1929.  Serial No. 387,812.

This invention relates to a composition for lowering the freezing point of water used in cooling systems of machine guns, aeroplane motors, and all kinds of operating parts where the machines are subjected to low temperature.

Another object of the invention is to provide a compound of the character referred to, that is a very efficient fire extinguisher.

An object of the invention is to provide a composition of the character referred to, which is free of acid, is non-corrosive to metal, wood or rubber hosing, and furthermore to provide a composition which will readily redissolve in water of renewal in event the cooling system would be rendered dry from inattention.

Another and important feature of the invention is to provide a composition that will extinguish fires originating in and around the operating mechanism.

Further objects of the invention are to provide, in a manner as hereinafter set forth, a composition of the character referred to, which is very simple and economical to manufacture, very reliable for its intended purpose and requiring the minimum of technical skill in its manufacture.

With the foregoing and other objects in view, the invention consists of a novel arrangement, manipulation and fabrication of elements as will herein be more specifically described and illustrated in the accompanying specification, wherein an embodiment of the invention is disclosed, but it is to be understood that changes, variations and modifications may be resorted to without departing from the spirit of the claims hereto appended.

It is to be understood that the invention is to be used as the cooling medium for the cooling systems of various type engines which use water as a cooling medium for overcoming the generation of heat caused by friction in the machine.

The following ingredients are to be understood as added in the proportion given, to one gallon of water. One gallon of water is brought to a boil and at this temperature the sodium chloride is added. The water and sodium chloride solution are permitted to boil for about one minute whereby the sodium chloride will be dissolved. While the water is still warm, but under the temperature 212 degrees Fahrenheit, three ounces of magnesium sulphate are added and the solution stirred until the latter is completely dissolved.

Thereafter, three ounces of crystallized sugar are mixed in the solution until it is dissolved. Three ounces of sodium nitrate is next added to the solution and stirred well until the latter is dissolved therein. It is to be understood that all of the foregoing ingredients are added in the crystallized form or powdered form while the solution is still warm, but under the boiling point.

At this point, the solution is permitted to cool to room temperature and the following ingredients are added thereto. Three cubic centimeters of ten percent (10%) iodine solution are added; next, three cubic centimeters of oil of Mentha crista are added; and thereafter five cubic centimeters of $C_3H_8O_3$ glycerine are added and the entire solution is stirred thoroughly to incorporate the liquid ingredients of the compound.

The elements of my formula are enumerated below for the purpose of clarity:

1 gallon of water.
24 ounces of sodium chloride (NaCl).
3 ounces of nitrate ($NaNO_3$).
3 ounces magnesium sulphate ($MgSO_4 + 7H_2O$).
3 ounces of sugar ($C_{12}H_{22}O_{11}$).
3 cubic centimeters of iodine—10% water solution.
3 cubic centimeters of oil of Mentha crista.
5 cubic centimeters glycerine ($C_3H_8O_3$).

The sodium chloride is basic solution and is the ingredient which lowers the freezing point of the water considerably. Iodine adds to the non-corroding quality and lowers the freezing point also. Glycerine tends to prevent evaporation. Mentha crista is an oily extract from the mint plant that prevents rusting of metal parts. Sugar prevents crystallization of the sodium chloride in event of excess evaporation. Magnesium sulphate not only lowers the freezing point of the solution but provides efficient fire extinguishing qualities to the compound. The sodium nitrate also stops crystallization and adds to the fire extingiushing qualities.

A very important feature of the present invention is the fact that the ingredients do not evaporate, but remain in the container or water cooling receptacle indefinitely and if the water itself should evaporate, it will readily go into solution upon the addition of water to the cooling system.

It is to be understood that by describing in detail herein any particular sequence, structure, or arrangement, it is not intended to limit the invention beyond the terms of the several claims or the requirements of the prior art.

Having described my invention, what I claim is:

1. A composition for lowering the freezing point of cooling systems comprising an aqueous solution of sodium chloride, sodium nitrate, magnesium sulphate, sugar, iodine, oil of Mentha crista, and glycerine.

2. A composition for lowering the freezing point of cooling mediums comprising the following ingredients dissolved in one gallon of water; twenty-four ounces of sodium chloride; three ounces of sodium nitrate; three ounces of magnesium sulphate; three ounces of sugar; three cubic centimeters of ten per cent idoine; three cubic centimeters of oil of Mentha crista and five cubic centimeters of glycerine.

In testimony whereof I affix my signature.

HENRY GUSTAV SCHMIDT.